United States Patent
Tang (10) Patent No.: US 11,758,520 B2
(45) Date of Patent: Sep. 12, 2023

(54) METHOD FOR RESOURCE POOL SHARING IN D2D COMMUNICATION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 125 days.

(21) Appl. No.: 16/986,433

(22) Filed: Aug. 6, 2020

(65) Prior Publication Data

US 2020/0367220 A1     Nov. 19, 2020

Related U.S. Application Data

(63) Continuation of application No. PCT/CN2017/109402, filed on Nov. 3, 2017.

(51) Int. Cl.
*H04W 72/04* (2023.01)
*H04W 72/02* (2009.01)
(Continued)

(52) U.S. Cl.
CPC ......... *H04W 72/044* (2013.01); *H04W 72/02* (2013.01); *H04W 72/23* (2023.01); *H04W 76/11* (2018.02)

(58) Field of Classification Search
CPC . H04W 72/042; H04W 72/044; H04W 76/11; H04W 72/02; H04W 76/14;
(Continued)

(56) References Cited

U.S. PATENT DOCUMENTS

2015/0382324 A1   12/2015 Sheng et al.
2016/0014814 A1*   1/2016 Li .................... H04W 74/0808
                                                                370/329
(Continued)

FOREIGN PATENT DOCUMENTS

CN    103957518 A1    7/2014
CN    105246025 A     1/2016
(Continued)

OTHER PUBLICATIONS

3rd Generation Partnership Project;3GPP TS 36.213, Technical Specification Group Radio Access Network; "Evolved Universal Terrestrial Radio Access (E-UTRA); Physical layer procedures, (Release 14)", Sep. 2017 (Sep. 2017).
(Continued)

*Primary Examiner* — Pankaj Kumar
*Assistant Examiner* — Kenneth P Hunt
(74) *Attorney, Agent, or Firm* — PERKINS COIE LLP (57) ABSTRACT

Disclosed are a method for sharing a resource pool in device to device (D2D) communication, a terminal device and a network device. The method includes that: a terminal device determines a plurality of candidate resource pools; the terminal device determines a target resource pool of the terminal device for data transmission from the plurality of candidate resource pools according to an indication of a network device; and the terminal device performs the data transmission in the target resource pool. Therefore, the terminal devices using different transmission modes can select appropriate transmission resources for transmitting data and reducing interference in a communication system.

10 Claims, 8 Drawing Sheets

(51) Int. Cl.
*H04W 76/11* (2018.01)
*H04W 72/044* (2023.01)
*H04W 72/23* (2023.01)

(58) Field of Classification Search
CPC ........... H04W 4/04; H04W 4/44; H04W 4/46; H04W 92/16
See application file for complete search history.

(56) References Cited

U.S. PATENT DOCUMENTS

| | | | |
|---|---|---|---|
| 2016/0037524 A1* | 2/2016 | Krzymien | H04L 27/2601 370/329 |
| 2016/0295624 A1* | 10/2016 | Novlan | H04L 67/12 |
| 2016/0353416 A1 | 12/2016 | Takano | |
| 2018/0249487 A1* | 8/2018 | Takeda | H04L 27/2636 |
| 2019/0007959 A1* | 1/2019 | Hwang | H04W 72/0446 |
| 2020/0015272 A1* | 1/2020 | Lee | H04W 8/005 |
| 2020/0187163 A1* | 6/2020 | Lu | H04W 76/11 |
| 2020/0195276 A1* | 6/2020 | Wu | H03M 13/251 |
| 2022/0039078 A1* | 2/2022 | Wang | H04W 72/02 |
| 2022/0201546 A1* | 6/2022 | Wang | H04W 24/10 |

FOREIGN PATENT DOCUMENTS

| | | |
|---|---|---|
| CN | 105451237 A1 | 3/2016 |
| CN | 105993201 A | 10/2016 |
| CN | 106416405 A | 2/2017 |
| CN | 106688295 A | 5/2017 |
| CN | 107295674 A1 | 10/2017 |
| WO | 2015200607 A1 | 12/2015 |
| WO | 2017041355 A1 | 3/2017 |

OTHER PUBLICATIONS

Third Office Action of the Chinese application No. 201780091716.9, dated Dec. 2, 2020.
ZTE. Considerations for Shared Resource Pool between Mode 3 and Mode 4. 3GPP TSG RAN WG1 Meeting #90 R1-1712934. Aug. 25, 2017 (Aug. 25, 2017), text, sections 2 and 3.
International Search Report in the international application No. PCT/CN2017/109402, dated May 29, 2018.
English Translation of the Written Opinion of the International Search Authority in the international application No. PCT/CN2017/109402, dated May 29, 2018.
First Office Action of the Chinese application No. 201780091716.9, dated Apr. 28, 2020.
Second Office Action of the Chinese application No. 201780091716.9, dated Jul. 22, 2020.

* cited by examiner

METHOD FOR RESOURCE POOL SHARING IN D2D COMMUNICATION, TERMINAL DEVICE AND NETWORK DEVICE

CROSS-REFERENCE TO RELATED APPLICATION

This application is a continuation of International Patent Application No. PCT/CN2017/109402, filed on Nov. 3, 2017, the entire content of which is incorporated herein by reference.

TECHNICAL FIELD

Embodiments of the disclosure relate to the field of wireless communications, and more particularly to a method for sharing a resource pool in device to device (D2D) communication, a terminal device and a network device.

BACKGROUND

Vehicle to Vehicle (V2V) or Vehicle to Everything (V2X) communication is a Sidelink (SL) transmission technology based on D2D communication. Unlike receiving and sending of data through a base station in a traditional Long Term Evolution (LTE) system, terminal-to-terminal communication is applied to a V2V system, and thus a higher spectral efficiency and a lower transmission latency can be obtained.

In the Release-14 of the 3rd Generation Partnership Project (3GPP) protocol, two transmission modes, i.e., transmission mode 3 (mode 3) and transmission mode 4 (mode 4), are defined for the V2V. A resource used by a terminal using the transmission mode 3 may be allocated by a base station, and the terminal may transmit data on SL according to the resource allocated by the base station. However, a terminal using the transmission mode 4 can independently select a transmission resource of the SL, for example, the terminal may randomly select a resource on the SL or determine the resource by sensing. The terminal device using the transmission mode 3 and the terminal device using the transmission mode 4 may transmit data in different resource pools.

In the Release-15 of the 3GPP protocol, in order to improve the utilization rate of resources, the terminal device using the transmission mode 3 and the terminal device using the transmission mode 4 may share a resource pool, and thus a higher requirement is imposed on resource selection.

Therefore, how terminal devices using different transmission modes select appropriate transmission resources for transmitting data and reducing interference in a communication system becomes a problem to be solved urgently.

SUMMARY

Embodiments of the disclosure provide a method for sharing a resource pool in D2D communication, a terminal device and a network device, such that terminal devices using different transmission modes can select appropriate transmission resources for transmitting data and reducing interference in a communication system.

A first aspect provides a method for sharing a resource pool in D2D communication, which may include that:

a terminal device receives configuration information from a network device, the configuration information indicating a plurality of candidate resource pools;

the terminal device determines the plurality of candidate resource pools based on the configuration information;

the terminal device receives downlink control information (DCI) from the network device, the DCI carrying resource pool indication information, and the resource pool indication information indicating a target resource pool of the terminal device for data transmission;

the terminal device determines the target resource pool of the terminal device for data transmission from the plurality of candidate resource pools according to the resource pool indication information carried in the DCI; and the terminal device performs the data transmission in the target resource pool.

A second aspect provides a method for sharing a resource pool in D2D communication, which may include that:

a network device determines a target resource pool of a terminal device for data transmission from a plurality of candidate resource pools; and the network device indicates the target resource pool to the terminal device.

A third aspect provides a terminal device, which may execute the operations of the terminal device in the first aspect or any optional implementation manner of the first aspect. Specifically, the terminal device may include modular units configured to execute the operations of the terminal device in the first aspect.

A fourth aspect provides a network device, which may execute the operations of the network device in the second aspect or any optional implementation manner of the second aspect. Specifically, the network device may include modular units configured to execute the operations of the network device in the second aspect.

A fifth aspect provides a terminal device, which may include: a processor, a transceiver connected to the processor and configured to receive and send information under control of the processor. The processor and the transceiver can communicate with one another through an internal connecting path. The processor is configured to control the transceiver to receive configuration information from a network device, the configuration information indicating a plurality of candidate resource pools; determine the plurality of candidate resource pools based on the configuration information; receive downlink control information (DCI) from the network device, the DCI carrying resource pool indication information, and the resource pool indication information indicating a target resource pool of the terminal device for data transmission; determine the target resource pool of the terminal device for data transmission from the plurality of candidate resource pools according to the resource pool indication information carried in the DCI; and perform the data transmission in the target resource pool.

A sixth aspect provides a network device, which includes a processor, a transceiver and a memory. The processor, the transceiver and the memory communicate with one another through an internal connecting path. The memory is configured to store an instruction, and the processor is configured to execute the instruction stored in the memory. When the processor executes the instruction stored in the memory, such execution causes the network device to implement the method in the second aspect or any possible implementation manner of the second aspect, or such execution causes the network device to implement the network device provided in the fourth aspect.

A seventh aspect provides a non-transitory computer-readable storage medium, which stores a program, the program causing a terminal device to implement any method for sharing a resource pool in D2D communication in the first aspect and each implementation manner thereof.

An eighth aspect provides a non-transitory computer-readable storage medium, which stores a program, the program causing a network device to implement any method for sharing a resource pool in D2D communication in the second aspect.

A ninth aspect provides a system chip, which may include an input interface, an output interface, a processor and a memory. The processor is configured to execute an instruction stored in the memory. When the instruction is executed, the processor may implement the method in the first aspect.

A tenth aspect provides a system chip, which may include an input interface, an output interface, a processor and a memory. The processor is configured to execute an instruction stored in the memory. When the instruction is executed, the processor may implement the method in the second aspect.

An eleventh aspect provides a computer program product including an instruction, which runs in a computer to enable the computer to implement the method in the first aspect.

A twelfth aspect provides a computer program product including an instruction, which runs in a computer to enable the computer to implement the method in the second aspect.

DETAILED DESCRIPTION

The technical solutions in the embodiments of the disclosure are described below in combination with the accompanying drawings.

It is to be understood that the technical solutions in the embodiments of the disclosure may be applied to various communication systems, for example, a Global System of Mobile Communication (GSM), a Code Division Multiple Access (CDMA) system, a Wideband Code Division Multiple Access (WCDMA) system, a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) communication system.

The disclosure describes various embodiments in combination with a terminal device. The terminal device may also be User Equipment (UE), an access terminal, a user unit, a user station, a mobile station, a mobile platform, a remote station, a remote terminal, a mobile device, a user terminal, a terminal, a wireless communication device and a user proxy or user apparatus. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved Public Land Mobile Network (PLMN) or the like.

The disclosure describes various embodiments in combination with a network device. The network device may be a device for communicating with the terminal device. For example, the network device may be a Base Transceiver Station (BTS) in a GSM or CDMA, may also be a NodeB (NB) in a WCDMA system, and may further be an Evolutional NodeB (eNB or eNodeB) in an LTE system. Or, the network device may be a relay station, an access point, a vehicle-amounted device, a wearable device as well as a network side device in the future 5G network or a network side device in the future evolved PLMN network.

Figure 1:
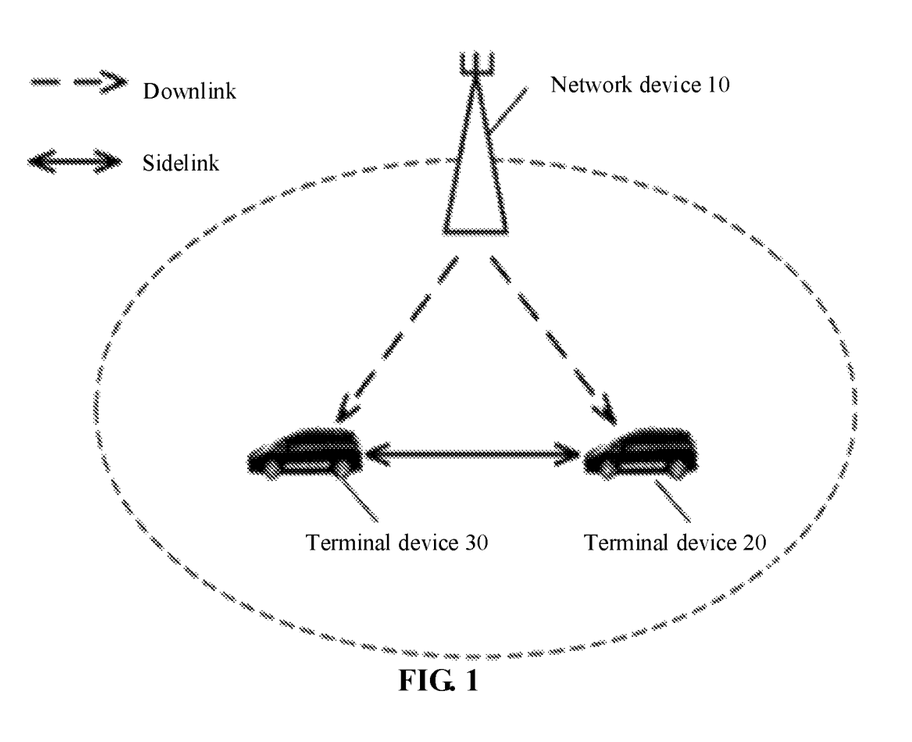
FIG. 1 is a schematic architecture diagram of an application scenario according to an embodiment of the disclosure.
Figure 2:
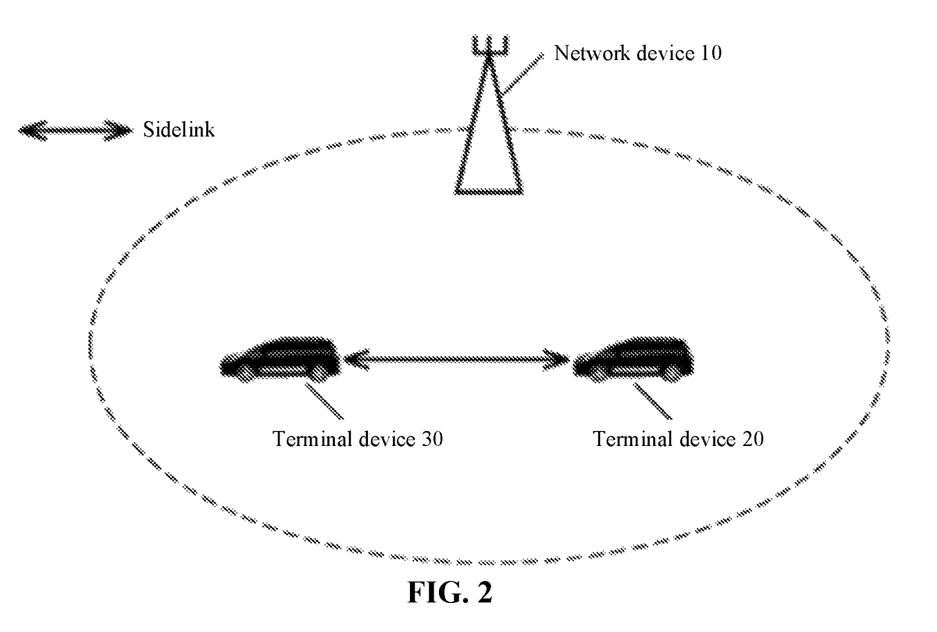
FIG. 2 is a schematic architecture diagram of another application scenario according to an embodiment of the disclosure.

FIG. 1 and FIG. 2 is a schematic diagram of an application scenario according to an embodiment of the disclosure. FIG. 1 systematically illustrates one network device and two terminal devices. Optionally, the wireless communication system may include a plurality of network devices, and another number of terminal devices, other than two, may be included within a coverage range of each network device, all of which are not defined by the embodiments of the disclosure. Additionally, the wireless communication system may further include a Mobile Management Entity (MME), a Serving Gateway (S-GW), a Packet Data Network Gateway (P-GW) and other network entities but is not limited thereto in the embodiments of the disclosure.

Specifically, a terminal device 20 may communicate with a terminal device 30 through D2D communication. During D2D communication, the terminal device 20 can directly communicate with the terminal device 30 through a D2D link (i.e., Sidelink, SL for short). For example, as shown in FIG. 1 or FIG. 2, the terminal device 20 can directly communicate with the terminal device 30 through the SL. In FIG. 1, the terminal device 20 can communicate with the terminal device 30 through the SL, and transmission resources of the two terminal devices may be allocated by a network device. In FIG. 2, the terminal device 20 communicates with the terminal device 30 through the SL, and transmission resources are independently selected by the terminal devices and unnecessarily allocated by the network device.

The D2D communication may refer to Vehicle to Vehicle ("V2V") communication or Vehicle to Everything (V2X) communication. In the V2X communication, the X may generally refer to any device having wireless receiving and sending capabilities, for example, including but not limited to a wireless apparatus that moves slowly, a vehicle-mounted device that moves quickly, or a network control node having the wireless receiving and sending capabilities, etc. It is to be understood that the embodiments of the disclosure are mainly applied to the V2X communication scenario but may also be applied to any other D2D communication scenarios, which is not defined by the embodiments of the disclosure.

The V2V system may be provided with two types of terminal devices, namely, a terminal device having a sensing capability such as a Vehicle User Equipment (VUE) or a Pedestrian User Equipment (PUE), and a terminal device not having the sensing capability such as PUE. The VUE has a higher processing capability and is generally powered by a storage battery in the vehicle. However, the PUE has a lower processing capability, and lowering the power consumption is also the main factor to be considered by the PUE. As a consequence, in an existing V2V system, the VUE is considered as having the complete receiving and sensing capabilities, and the PUE is considered as having a part of receiving and sensing capabilities or not having the receiving and sensing capabilities. When the PUE has a part of sensing capability, the PUE may perform resource selection through a sensing method similar to that of the VUE, and select an available resource on the sensible part of resources.

In the Release-14 of the 3GPP protocol, two transmission modes, i.e., transmission mode 3 (mode 3) and transmission mode 4 (mode 4), are defined. The transmission resource of a terminal device using the transmission mode 3 is typically allocated by a base station, and the terminal device can send data on SL according to the resource allocated by the base station. The base station may allocate resources to the terminal device for single transmission, and may also allocate semi-static transmission resources to the terminal device. When a terminal device using the transmission mode 4 has the sensing capability, data can be transmitted by means of sensing and reservation. When the terminal device does not have the sensing capability, a transmission resource may be randomly selected from a resource pool. The vehicle terminal having the sensing capability may acquire an available resource set from the resource pool by sensing, and the terminal device may randomly select one resource from the resource set for data transmission. Since a service in a V2V system is periodic, a terminal device usually adopts semi-static transmission, i.e., after selecting a transmission resource, the terminal device may keep using the transmission resource in a plurality of transmission cycles, so that probabilities of resource reselection and resource conflict are reduced. The terminal device may make information of reserving a resource for next transmission carried into control information transmitted this time such that another terminal device can detect the control information of the terminal device to determine whether the resource has been reserved and used by the terminal device, thereby reducing resource conflicts.

In the Release-14 of the 3GPP protocol, a resource pool corresponding to the transmission mode 3 and a resource pool corresponding to the transmission mode 4 are orthogonal. A terminal device using the mode 3 may transmit data on a time-frequency resource in a resource pool supporting the mode 3, and a terminal device using the mode 4 may transmit data on a time-frequency resource in a resource pool supporting the mode 4.

In the new Release-15 of the 3GPP protocol, in order to improve the utilization rate of resources, a terminal device using the transmission mode 3 and a terminal device using the transmission mode 4 may share a resource pool. For example, two resource pools are provided for the terminal device using the transmission mode 3, in which one resource pool is merely used by the terminal device using the transmission mode 3 to perform D2D communication, and the other resource pool is shared by the terminal device using the transmission mode 3 and a terminal device using the transmission mode 4. When selecting the transmission resource for data transmission, the terminal device using the transmission mode 3 needs to know own specifically used resource pool.

Therefore, the embodiments of the disclosure indicate a resource pool to a terminal device by many ways, such that terminal devices using different transmission modes can select appropriate transmission resources for data transmission and reduce the mutual interference in a communication system.

It is to be understood that in the embodiments of the disclosure, a terminal device supporting the Release-15 may include a terminal device supporting the Release-15 or a terminal device supporting other versions of the Release-15, such as a terminal device supporting the Release-16 of the Release-15.

Figure 3:
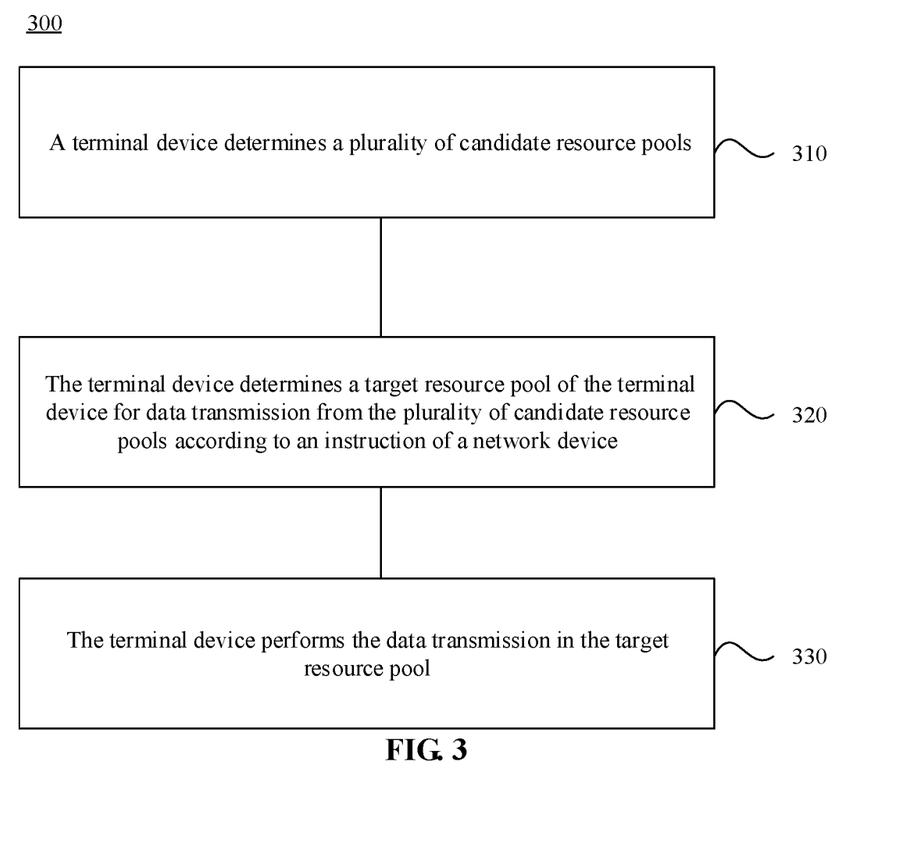
FIG. 3 is a schematic flowchart of a method for sharing a resource pool in D2D communication according to an embodiment of the disclosure.

FIG. 3 is a schematic flowchart of a method for sharing a resource pool in D2D communication according to an embodiment of the disclosure. The method may be implemented by a terminal device. The terminal device may be, for example, the terminal device 20 or the terminal device 30 shown in FIG. 1. The method for sharing a resource pool may include at least a part of the following contents.

At operation 310, a terminal device determines a plurality of candidate resource pools.

Optionally, the operation that the terminal device determines the plurality of candidate resource pools may include that: the terminal device receives configuration information from a network device, the configuration information indicating the plurality of resource pools; or the terminal device determines the plurality of resource pools according to information of the plurality of resource pools that is pre-stored in the terminal device.

Optionally, the plurality of resource pools may include a first resource pool and a second resource pool, the first resource pool is a resource pool that is used alone by a terminal device using a first transmission mode, and the second resource pool is a resource pool shared by the terminal device using the first transmission mode and a terminal device using a second transmission mode.

Optionally, a time-frequency resource used by the terminal device using the first transmission mode for the data transmission may be a resource scheduled by the network device; and a time-frequency resource used by the terminal device using the second transmission mode for the data transmission may be a resource that is independently selected by the terminal device using the second transmission mode from a resource pool corresponding to the second transmission mode.

Specifically, the first transmission mode may be, for example, the transmission mode 3 in the Release-14 of the 3GPP protocol. When the terminal device uses the first transmission mode, the time-frequency resource used by the terminal device for the data transmission is the resource scheduled by the network device. The second transmission mode may be, for example, the transmission mode 4 in the Release-14 of the 3GPP protocol. When the terminal device uses the second transmission mode, the time-frequency resource may be the resource independently selected by the terminal device, for example, the time-frequency resource is a resource randomly selected from a resource pool configured by a network device for the terminal device using the transmission mode 4, or a resource determined by the terminal device based on a resource sensing result.

For example, the network device may configure two resource pools for the terminal device using the transmission mode 3, one resource pool being merely used by the terminal device using the transmission mode 3 for the D2D communication, and the other resource pool being shared by the terminal device using the transmission mode 3 and the terminal device using the transmission mode 4. The terminal device using the transmission mode 3 and the terminal device using the transmission mode 4 may both perform the D2D communication in the shared resource pool. Accordingly, when the terminal device is the terminal device using the transmission mode 3, the terminal device needs to know which resource pool is to be adopted for data transmission.

At operation 320, the terminal device determines a target resource pool of the terminal device for data transmission from the plurality of candidate resource pools according to an indication of a network device.

Specifically, the terminal device may determine the target transmission pool for the data transmission according to resource pool indication information sent by the network device, the resource pool indication information indicating the target resource pool. For example, the terminal device may determine the target resource pool according to the resource pool indication information sent by the network device and carried in DCI or RRC signaling. Or, the terminal device may also determine the target resource pool based on an explicit or implicit indication of the network device, such as based on different processing of the network device on the sent DCI, without involving any new signaling overheads.

In the embodiments of the disclosure, the terminal device may determine the target resource pool through any of the following five manners, and select a resource from the target resource pool for the data transmission.

Manner 1

Optionally, in operation 310, the operation that the terminal device determines the target resource pool of the terminal device for the data transmission from the plurality of candidate resource pools according to the indication of a network device may include that: the terminal device receives DCI from the network device, the DCI carrying resource pool indication information, and the resource pool indication information indicating the target resource pool.

Manner 2

Optionally, in operation 310, the operation that the terminal device determines the target resource pool of the terminal device for the data transmission from the plurality of candidate resource pools according to the indication of a network device may include that: the terminal device receives RRC signaling from the network device, the RRC signaling carrying resource pool indication information, and the resource pool indication information indicating the target resource pool.

Manner 3

Optionally, in 310, the operation that the terminal device determines the target resource pool of the terminal device for the data transmission from the plurality of candidate resource pools according to the indication of a network device may include that: the terminal device receives DCI from the network device; and the terminal device determines the target resource pool according to a target RNTI for descrambling the DCI.

Herein, the target RNTI may be an RNTI used by the network device for scrambling the DCI. Correspondingly, the terminal device can descramble the DCI by using the target RNTI. However, the disclosure is not limited to this. The target RNTI may be other RNTIs carried in the DCI, and the terminal device may determine the target resource pool according to the target RNTI carried in the DCI.

Further, optionally, the operation that the terminal device determines the target resource pool according to the target RNTI for descrambling the DCI may include that: the terminal device determines a resource pool corresponding to the target RNTI as the target resource pool according to the target RNTI and mapping relationships between a plurality of RNTIs and a plurality of resource pools.

Specifically, the network device may be provided with a plurality of RNTIs. There are mapping relationships between the plurality of resource pools and the plurality of RNTIs. The plurality of RNTIs may be in one-to-one correspondence with the plurality of resource pools, or one RNTI may correspond to a plurality of resource pools, or one resource pool may correspond to a plurality of RNTIs.

When target resource pools selected by the network device for the terminal device are different, the network device may use different RNTIs to scramble DCI to be sent. Upon determining a target resource pool used by the terminal device, the network device may determine a target RNTI corresponding to the target resource pool based on the target resource pool and the mapping relationships, and scramble the DCI by using the target RNTI. The mapping relationships may be, for example, represented by a mapping relationship table, and the terminal device may select, according to the target RNTI used for descrambling the DCI, a resource pool corresponding to the target RNTI as the target resource pool based on the mapping relationship table.

In the embodiment, the terminal device may determine the target resource pool for the data transmission according to the RNTI for descrambling the DCI, and then select an appropriate resource from the target resource pool for the data transmission, without increasing the signaling overheads. For example, the terminal device may select, according to scheduling information in the DCI, a resource scheduled by the scheduling information from the target resource pool for the data transmission.

Manner 4

Optionally, in 310, the operation that the terminal device determines the target resource pool of the terminal device for the data transmission from the plurality of candidate resource pools according to the indication of a network device may include that: the terminal device receives DCI from the network device; and the terminal device determines the target resource pool according to a target mask sequence for demasking the DCI.

Further, optionally, the operation that the terminal device determines the target resource pool according to the target mask sequence for demasking the DCI may include that: the terminal device determines a resource pool corresponding to the target mask sequence as the target mask sequence and mapping relationships between a plurality of mask sequences and a plurality of resource pools.

Specifically, the network device may be provided with a plurality of mask sequences. There are mapping relationships between the plurality of resource pools and the plurality of mask sequences. The plurality of mask sequences may be in one-to-one correspondence with the plurality of resource pools, or one mask sequence may correspond to a plurality of resource pools, or one resource pool may correspond to a plurality of mask sequences. When target resource pools selected by the network device for the terminal device are different, the network device may use different mask sequences to mask DCI to be sent. Upon determining a target resource pool used by the terminal device, the network device may determine, based on the target resource pool and the mapping relationships, a target mask sequence corresponding to the target resource pool, and mask the DCI by using the target mask sequence. The mapping relationships may be, for example, represented by a mapping relationship table. The terminal device may select, according to the target mask sequence used for masking the DCI, a resource pool corresponding to the target mask sequence as the target resource pool based on the mapping relationship table.

In the embodiment, the terminal device may determine the target resource pool for the data transmission according to the mask sequence for descrambling the DCI, and then select an appropriate resource from the target resource pool for the data transmission, without increasing any signaling overheads. For example, the terminal device may select, according to scheduling information in the DCI, a resource scheduled by the scheduling information from the target resource pool for the data transmission.

For example, as shown in Table 1, the mask sequence corresponding to the first resource pool is {0, 0, 0, 0, 0, 0, 0, 0, 0, 0, 0, 0, 0, 0, 0, 0}, and the mask sequence corresponding to the second resource pool is {0, 0, 0, 0, 0, 0, 0, 0, 0, 0, 0, 0, 0, 0, 0, 1}. When the terminal device determines that the received mask sequence used by the DCI is {0, 0, 0, 0, 0, 0, 0, 0, 0, 0, 0, 0, 0, 0, 0, 0}, the terminal device may determine the target resource pool as a first resource pool, i.e., the resource pool used alone by the terminal device using the first transmission mode. When the terminal device determines that the received mask sequence used by the DCI is {0, 0, 0, 0, 0, 0, 0, 0, 0, 0, 0, 0, 0, 0, 0, 1}, the terminal device may determine the target resource pool as a second resource pool, i.e., the resource pool shared by the terminal device using the first transmission mode and the terminal device using the second transmission mode.

TABLE 1

| Target resource pool | Mask sequence ($x_{mask, 0}$, $x_{mask, 1}$, $x_{mask, 2}$, . . . , $x_{mask, 15}$) |
|---|---|
| First resource pool | {0, 0, 0, 0, 0, 0, 0, 0, 0, 0, 0, 0, 0, 0, 0, 0} |
| Second resource pool | {0, 0, 0, 0, 0, 0, 0, 0, 0, 0, 0, 0, 0, 0, 0, 1} |

Manner 5

Optionally, in operation 310, the operation that the terminal device determines the target resource pool of the terminal device for the data transmission from the plurality of candidate resource pools according to the indication of a network device may include that: the terminal device receives DCI from the network device; and the terminal device determines the target resource pool according to a target search space for receiving the DCI.

Further, optionally, the operation that the terminal device determines the target resource pool according to the target search space for receiving the DCI may include that: the terminal device determines a resource pool corresponding to the target search space as the target resource pool according to the target search space and mapping relationships between a plurality of search spaces and a plurality of resource pools.

Optionally, the plurality of target search spaces may include a dedicated search space and a common search space of the terminal device.

In the embodiment, the terminal device may determine the target resource pool for the data transmission according to the search space for receiving the DCI, and then select an appropriate resource from the target resource pool for the data transmission, without increasing any signaling overheads. For example, the terminal device may select, according to scheduling information in the DCI, a resource scheduled by the scheduling information from the target resource pool for the data transmission.

For example, if the terminal device receives the DCI in the dedicated search space of the terminal device, the terminal device can determines the target resource pool as a first resource pool. If the terminal device receives the DCI in the common search space of the terminal device, the terminal device can determine the target resource pool as a second resource pool.

Also as an example, if the terminal device receives the DCI in the dedicated search space of the terminal device, the terminal device can determine the target resource pool as a second resource pool. If the terminal device receives the DCI in the common search space of the terminal device, the terminal device can determine the target resource pool as a first resource pool.

At operation 330, the terminal device performs the data transmission in the target resource pool.

In an example, the terminal device using the first transmission mode may receive a resource scheduled by the scheduling information from the target resource pool for data transmission according to scheduling information carried in the received DCI. The terminal device using the second transmission mode may sense and select an appropriate resource from the target resource pool for the data transmission.

In the embodiments of the disclosure, a terminal device may select a target resource pool for present data transmission from a plurality of candidate resource pools according to information sent by the network device and explicitly or implicitly carried in DCI. Therefore, terminal devices using the different transmission modes can select appropriate transmission resources from a resource pool indicated by a network device for data transmission and can reduce the mutual interference.

Figure 4:
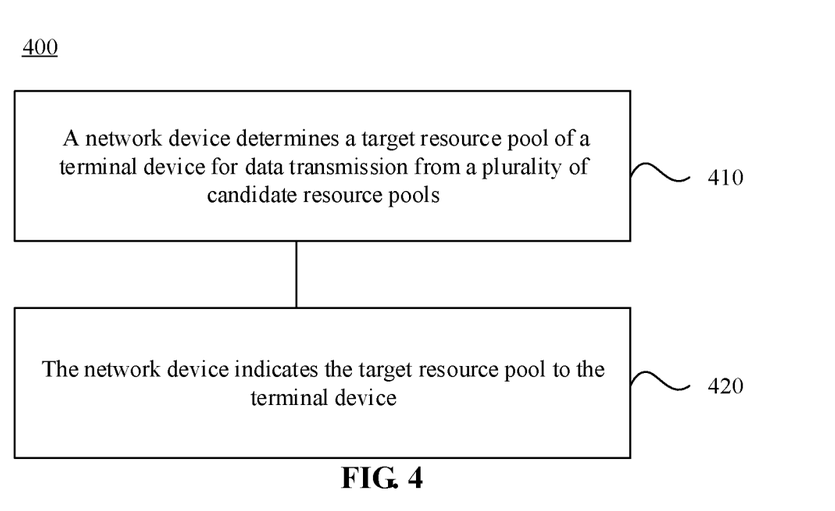
FIG. 4 is a schematic flowchart of a method for sharing a resource pool in D2D communication according to another embodiment of the disclosure.

FIG. 4 is a schematic flowchart of a method for sharing a resource pool in D2D communication according to an embodiment of the disclosure. The method shown in FIG. 4 may be executed by a network device. The network device may be, for example, the network device 10 shown in FIG. 1. As shown in FIG. 4, the method for sharing the resource pool in the D2D communication may include the following operations.

At operation 410, a network device determines a target resource pool of a terminal device for data transmission from a plurality of candidate resource pools.

Optionally, the plurality of resource pools may include a first resource pool and a second resource pool, the first resource pool is a resource pool that is used alone by a terminal device using a first transmission mode, and the second resource pool is a resource pool shared by the terminal device using the first transmission mode and a terminal device using a second transmission mode.

Optionally, a time-frequency resource used by the terminal device using the first transmission mode for the data transmission may be a resource scheduled by the network device; and a time-frequency resource used by the terminal device using the second transmission mode for the data transmission may be a resource that is independently selected by the terminal device using the second transmission mode from a resource pool corresponding to the second transmission mode.

Optionally, before the network device indicates the target resource pool to the terminal device, the method may further include that: the network device sends configuration information to the terminal device, the configuration information indicating the plurality of resource pools.

In the embodiment of the disclosure, the network device may indicate the target resource pool to the terminal device through any of the following five manners.

Manner 1

Optionally, the operation that the network device indicates the target resource pool to the terminal device may include that: the network device sends DCI to the terminal device, the DCI carrying resource pool indication information, and the resource pool indication information indicating the target resource pool.

Manner 2

Optionally, the operation that the network device indicates the target resource pool to the terminal device may include that: the network device sends RRC signaling to the terminal device, the RRC signaling carrying resource pool indication information, and the resource pool indication information indicating the target resource pool.

Manner 3

Optionally, the operation that the network device indicates the target resource pool to the terminal device may include that: the network device determines, based on the target resource pool, a target RNTI for scrambling DCI to be sent, and scrambles the DCI to be sent by using the target RNTI; and the network device sends the DCI to the terminal device.

Further, optionally, the operation that the network device determines, based on the target resource pool, the target RNTI for scrambling the DCI to be sent may include that: the terminal device determines an RNTI corresponding to the target resource pool as the target RNTI based on the target resource pool and mapping relationships between a plurality of RNTIs and a plurality of resource pools.

For example, when the network device determines the target resource pool as the first resource pool, i.e., the resource pool used alone by the terminal device using the first transmission mode, a first RNTI may be used to scramble the DCI. When the network device determines the target resource pool as the second resource pool, i.e., the resource pool shared by the terminal device using the first transmission mode and the terminal device using the second transmission mode, a second RNTI may be used to scramble the DCI.

Herein, the target RNTI may be an RNTI used by the network device for scrambling the DCI. Correspondingly, the terminal device may descramble the DCI by using the target RNTI. However, the disclosure is not limited to this. The target RNTI may further be other RNTIs born in the DCI. Upon determining the target resource pool, the network device can determine the target RNTI based on the target resource pool, and carry the target RNTI through the DCI to be sent, such that after receiving the DCI, the terminal device can determine the target resource pool according to the target RNTI carried therein.

In the embodiment, the network device may scramble the DCI by using different RNTIs to implicitly indicate a transmission resource in a resource pool that is scheduled by the scheduling information in the DCI, and thus the terminal device can select the appropriate resource from the target resource pool indicated by the resource pool indication information for the data transmission.

Manner 4

Optionally, the operation that the network device indicates the target resource pool to the terminal device may include that: the network device determines, based on the target resource pool, a target mask sequence for masking DCI to be sent, and masks the DCI to be sent by using the target mask sequence; and the network device sends the DCI to the terminal device.

Further, optionally, the operation that the network device determines, based on the target resource pool, the target mask sequence for masking the DCI to be sent may include that: the terminal device determines a mask sequence corresponding to the target resource pool as the target mask sequence based on the target resource pool and mapping relationships between a plurality of mask sequences and a plurality of resource pools.

For example, as shown in Table 1, the mask sequence corresponding to the first resource pool is {0, 0, 0, 0, 0, 0, 0, 0, 0, 0, 0, 0, 0, 0, 0, 0}, and the mask sequence corresponding to the second resource pool is {0, 0, 0, 0, 0, 0, 0, 0, 0, 0, 0, 0, 0, 0, 0, 1}.

Supposing that the information bit of the DCI is expressed as $a_0, a_1, a_2, a_3, \ldots, a_{A-1}$, the Cyclic Redundancy Check (CRC) bit may be expressed as $p_0, p_1, p_2, p_3, \ldots, p_{L-1}$, where the A denotes a length of the information bit of the DCI, and the L denotes a length of the CRC bit. After added with the CRC bit sequence, the DCI may be expressed as $b_0, b_1, b_2, b_3, \ldots, b_{B-1}$, where $B=A+L$, $b_k=a_k$ (k=0, 1, 2, ..., A-1), and $b_k=p_{k-A}$ (k=A, A+1, A+2, ..., A+L-1). Then, the network device may scramble the sequence added with the CRC, a scrambling sequence being determined by a corresponding RNTI such as $x_{rnti,0}, x_{rnti,1}, x_{rnti,2}, \ldots, x_{rnti,15}$.

Thereafter, the network device can select, according to the determined target resource pool used by the terminal device for the data transmission, a mask sequence $X_{mask}$ corresponding to the target resource pool to mask a scrambled sequence, thereby obtaining a masked sequence $c_1, c_1, c_21 c_3, \ldots, c_{B-1}$, where, $c_k=b_k$ (k=0, 1, 2, ..., A-1), $c_k=(b_k+X_{rnti,k-A}+X_{mask,k-A})$ (k=A, A+11 A+2, ..., A+15).

In the embodiment, the network device may mask the DCI using different mask sequences to implicitly indicate a transmission resource in a resource pool that is scheduled by the scheduling information in the DCI, and thus the terminal device can select an appropriate resource from the target resource pool indicated by the resource pool indication information for the data transmission.

Manner 5

Optionally, the operation that the network device indicates the target resource pool to the terminal device may include that: the network device determines, based on the target resource pool, a target search space for sending the DCI; and the network device sends the DCI to the terminal device in the target search space.

Further, optionally, the operation that the network device determines, based on the target resource pool, the target search space for sending the DCI to be sent may include that: the terminal device determines a search space corresponding to the target resource pool as the target search space based on the target resource pool and mapping relationships between a plurality of search spaces and a plurality of resource pools.

Optionally, the plurality of target search spaces may include, for example, a dedicated search space and a common search space of the terminal device.

Therefore, the network device sends the resource indication information in different search spaces to implicitly indicate the transmission resource in the resource pool that is scheduled by the scheduling information in the DCI, and thus the terminal device can select the appropriate resource from the indicated target resource pool according to the resource pool indication information for the data transmission.

At operation 420, the network device indicates the target resource pool to the terminal device.

In the embodiments of the disclosure, a network device can explicitly or implicitly indicate a used resource pool to a terminal device by differently processing DCI to be sent, such that the terminal device can select, according to an indication of the network device, a target resource pool for the data transmission from a plurality of resource pools.

Therefore, the terminal devices using the different transmission modes can select the appropriate transmission resources from the resource pool indicated by the network device for the data transmission and can reduce the mutual interference.

It is to be understood that the process that the network device selects the target resource pool may specifically refer to the above FIG. 3 and relevant description on the process that the terminal device selects the resource pool in Table 1. For simplicity, no more elaborations will be made herein.

It is further to be understood that the sequence numbers of the foregoing processes do not mean execution sequences in various embodiments of the disclosure. The execution sequences of the processes should be determined according to functions and internal logics of the processes, and should not be construed as any limitation to the implementation processes of the embodiments of the disclosure.

The method for sharing a resource pool in D2D communication according to the embodiments of the disclosure is described above in detail. Hereinafter, apparatuses according to the embodiments of the disclosure are described in combination with FIG. 5 to FIG. 8. The technical features described in the method embodiments are applicable to the following apparatus embodiments.

Figure 5:
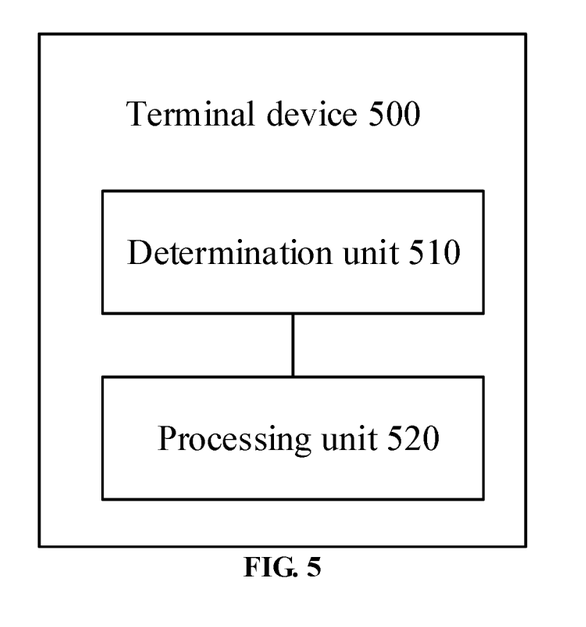
FIG. 5 is a schematic block diagram of a terminal device according to an embodiment of the disclosure.

FIG. 5 is a schematic block diagram of a terminal device 500 according to an embodiment of the disclosure. As shown in FIG. 5, the terminal device 500 may include a determination unit 510 and a transceiving unit 520.

The determination unit 510 is configured to determine a plurality of candidate resource pools.

The determination unit 510 is further configured to determine a target resource pool of the terminal device for data transmission from the plurality of candidate resource pools according to an indication of a network device.

The transceiving unit 520 is configured to perform the data transmission in the target resource pool determined by the determination unit 510.

Accordingly, the terminal device may select the target resource pool for the current data transmission from the plurality of candidate resource pools according to information sent by the network device and explicitly or implicitly carried in DCI. Therefore, the terminal devices using the different transmission modes can select appropriate transmission resources from the resource pool indicated by the network device for the data transmission and can reduce the mutual interference.

Optionally, the plurality of resource pools may include a first resource pool and a second resource pool, the first resource pool is a resource pool that is used alone by a terminal device using a first transmission mode, and the second resource pool is a resource pool shared by the terminal device using the first transmission mode and a terminal device using a second transmission mode.

Optionally, a time-frequency resource used by the terminal device using the first transmission mode for the data transmission is a resource scheduled by the network device; and a time-frequency resource used by the terminal device using the second transmission mode for the data transmission is a resource that is independently selected by the terminal device using the second transmission mode from a resource pool corresponding to the second transmission mode.

Optionally, the determination unit 510 is specifically configured to: receive DCI from the network device through the transceiving unit 520, and determine the target resource pool according to a target RNTI for descrambling the DCI.

Optionally, the determination unit 510 is specifically configured to determine a resource pool corresponding to the target RNTI as the target resource pool according to the target RNTI and mapping relationships between a plurality of RNTIs and a plurality of resource pools.

Optionally, the determination unit 510 is specifically configured to receive DCI from the network device through the transceiving unit 520, and determine the target resource pool according to a target mask sequence for demasking the DCI.

Optionally, the determination unit 510 is specifically configured to determine a resource pool corresponding to the target mask sequence as the target resource pool according to the target mask sequence and mapping relationships between a plurality of mask sequences and a plurality of resource pools.

Optionally, the determination unit 510 is specifically configured to receive DCI from the network device through the transceiving unit 520, and determine the target resource pool according to a target search space for receiving the DCI.

Optionally, the transceiving unit 520 is specifically configured to determine a resource pool corresponding to the target search space as the target resource pool according to the target search space and mapping relationships between a plurality of search spaces and a plurality of resource pools.

Optionally, the plurality of target search spaces may include a dedicated search space and a common search space of the terminal device.

Optionally, the determination unit 510 is specifically configured to receive DCI from the network device through the transceiving unit 520, the DCI carrying resource pool indication information, and the resource pool indication information indicating the target resource pool.

Optionally, the determination unit 510 is specifically configured to receive RRC signaling from the network device through the transceiving unit 520, the RRC signaling carrying resource pool indication information, and the resource pool indication information indicating the target resource pool.

Optionally, the determination unit 510 is specifically configured to: receive configuration information from the network device through the transceiving unit 520, the configuration information indicating the plurality of resource pools; or determine the plurality of resource pools according to information of the plurality of resource pools that is prestored in the terminal device.

It is to be understood that the terminal device 500 may execute corresponding operations of the method 300 executed by the terminal device in the above method embodiment. For simplicity, no more elaborations will be made herein.

Figure 6:
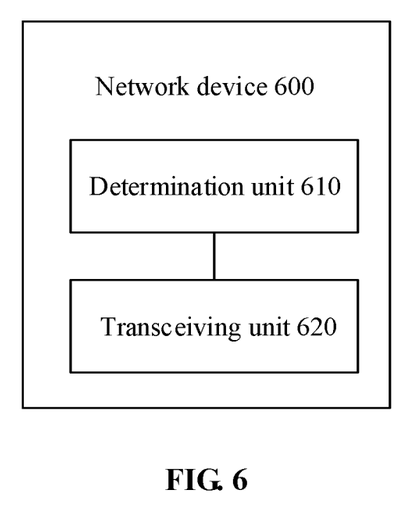
FIG. 6 is a schematic block diagram of a network device according to an embodiment of the disclosure.

FIG. 6 is a schematic block diagram of a network device 600 according to an embodiment of the disclosure. As shown in FIG. 6, the network device 600 may include a determination unit 610 and a processing unit 620.

The determination unit 610 is configured to determine a target resource pool of a terminal device for data transmission from a plurality of candidate resource pools.

The processing unit 620 is configured to indicate the target resource pool determined by the determination unit to the terminal device 610.

Accordingly, the network device can explicitly or implicitly indicate a used resource pool to the terminal device by differently processing DCI to be sent, such that the terminal device can select the target resource pool for the data transmission from the plurality of resource pools according to an indication of the network device. Therefore, terminal devices using different transmission modes can select appropriate transmission resources from the resource pool indicated by the network device for the data transmission and can reduce the mutual interference.

Optionally, the plurality of resource pools may include a first resource pool and a second resource pool, the first resource pool is a resource pool that is used alone by a terminal device using a first transmission mode, and the second resource pool is a resource pool shared by the terminal device using the first transmission mode and a terminal device using a second transmission mode.

Optionally, a time-frequency resource used by the terminal device using the first transmission mode for the data transmission is a resource scheduled by the network device; and a time-frequency resource used by the terminal device using the second transmission mode for the data transmission is a resource that is independently selected by the terminal device using the second transmission mode from a resource pool corresponding to the second transmission mode.

Optionally, the network device may further include a transceiving unit, and the processing unit 620 is specifically configured to: determine a target RNTI for scrambling DCI to be sent, and scramble the DCI to be sent by using the target RNTI; and send the DCI to the terminal device through the transceiving unit.

Optionally, the processing unit 620 is specifically configured to: determine an RNTI corresponding to the target resource pool as the target RNTI based on the target resource pool, and mapping relationships between a plurality of RNTIs and a plurality of resource pools.

Optionally, the network device may further include a transceiving unit, and the processing unit 620 is specifically configured to: determine, based on the target resource pool, a target mask sequence for masking DCI to be sent, and mask the DCI to be sent by using the target mask sequence; and send the DCI to the terminal device through the transceiving unit.

Optionally, the processing unit 620 is specifically configured to: determine a mask sequence corresponding to the target resource pool as the target mask sequence based on the target resource pool and mapping relationships between a plurality of mask sequences and a plurality of resource pools.

Optionally, the network device may further include a transceiving unit, and the processing unit 620 is specifically configured to: determine, based on the target resource pool, a target search space for sending DCI to be sent; and send the DCI to the terminal device in the target search space through the transceiving unit.

Optionally, the processing unit 620 is specifically configured to: determine a search space corresponding to the target resource pool as the target search space based on the target resource pool and mapping relationships between a plurality of search spaces and a plurality of resource pools.

Optionally, the plurality of target search spaces may include a dedicated search space and a common search space of the terminal device.

Optionally, the network device may further include a transceiving unit, and the processing unit 620 is specifically configured to: send DCI to the terminal device through the transceiving unit, the DCI carrying resource pool indication information, and the resource pool indication information indicating the target resource pool.

Optionally, the network device may further include a transceiving unit, and the processing unit 620 is specifically configured to: send RRC signaling to the terminal device through the transceiving unit, the RRC signaling carrying resource pool indication information, and the resource pool indication information indicating the target resource pool.

Optionally, the transceiving unit is further configured to send configuration information to the terminal device, the configuration information indicating the plurality of resource pools.

It is to be understood that the network device 600 may execute corresponding operations of the method 400 executed by the network device in the above method embodiment. For simplicity, no more elaborations will be made herein.

Figure 7:
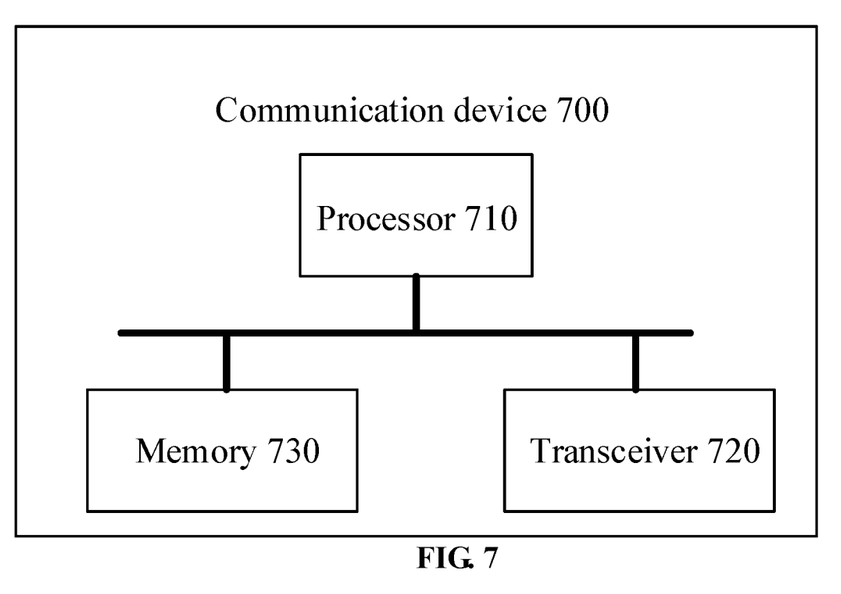
FIG. 7 is a schematic structural diagram of a communication device according to an embodiment of the disclosure.

FIG. 7 is a schematic structural diagram of a communication device 700 according to an embodiment of the disclosure. As shown in FIG. 7, the communication device includes a processor 710, a transceiver 720 and a memory 730. Herein, the processor 710, the transceiver 720 and the memory 730 can communicate with one another through an internal connecting path. The memory 730 is configured to store an instruction, and the processor 710 is configured to execute the instruction stored in the memory 730 to control the transceiver 720 to receive a signal or send a signal.

Optionally, the processor 710 may call a program code stored in the memory 730 to execute corresponding operations of the method 300 executed by a terminal device in the method embodiment. For similarity, no more elaborations will be made herein.

Optionally, the processor 710 may call a program code stored in the memory 730 to execute corresponding operations of the method 400 executed by a network device in the method embodiment. For similarity, no more elaborations will be made herein.

It is to be understood that the processor in the embodiment of the disclosure may be an integrated circuit chip and has a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the application may be a volatile memory or a nonvolatile memory, or may include both the volatile and nonvolatile memories. The nonvolatile memory may be an ROM, a PROM, an Erasable PROM (EPROM), an EEPROM or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Figure 8:
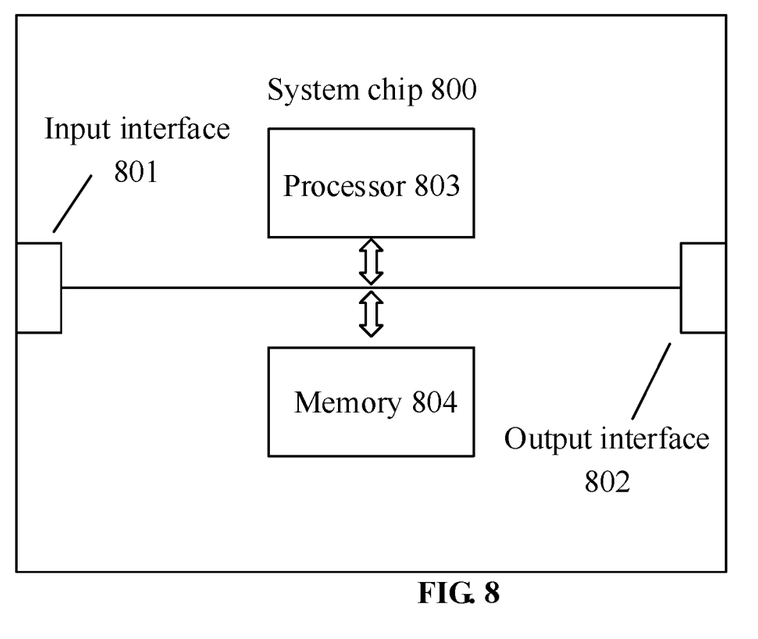
FIG. 8 is a schematic structural diagram of a system chip according to an embodiment of the disclosure.

FIG. 8 is a schematic structural diagram of a system chip according to an embodiment of the disclosure. The system chip 800 of FIG. 8 includes an input interface 801, an output interface 802, at least one processor 803 and a memory 804. The input interface 801, the output interface 802, the processor 803 and the memory 804 are connected with one another through an internal connecting path. The processor 803 is configured to execute a code in the memory 804.

Optionally, when the code is executed, the processor 803 may implement the method 300 executed by a communication device in the method embodiments. For simplicity, no more elaborations will be made herein.

Optionally, when the code is executed, the processor 803 may implement the method 400 executed by a communication device in the method embodiments. For simplicity, no more elaborations will be made herein.

A person of ordinary skill in the art may be aware that, in combination with the examples described in the embodiments disclosed in this specification, units and algorithm steps may be implemented by electronic hardware, computer software or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by the person skilled in the art that, for the purpose of convenient and brief description, a detailed working process of the foregoing system, apparatus, and unit may be referred to a corresponding process in the foregoing method embodiment, and details are not described herein again.

In the several embodiments provided in the disclosure, it is to be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, each functional unit in each embodiment of the application may be integrated into a monitoring unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the application. The abovementioned storage medium includes: various media capable of storing program codes such as a U disk, a mobile hard disk, a ROM, a RAM, a magnetic disk or an optical disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for device to device (D2D) communication, comprising:
  receiving, by a terminal device, configuration information from a network device, the configuration information indicating a plurality of candidate resource pools;
  determining, by the terminal device, the plurality of candidate resource pools based on the configuration information;
  receiving, by the terminal device, downlink control information (DCI) from the network device;
  determining, by the terminal device, a target resource pool of the terminal device for data transmission from the plurality of candidate resource pools according to a target search space for receiving the DCI; and
  performing, by the terminal device, the data transmission in the target resource pool.

2. The method of claim 1, wherein the DCI is scrambled by using a radio network temporary identity (RNTI).

3. The method of claim 1, wherein resources within each of the plurality of candidate resource pools are capable of being scheduled by the network device to the terminal device for data transmission.

4. The method of claim 1, wherein a time-frequency resource used by the terminal device using the first transmission mode for the data transmission is a resource scheduled by the network device; and a time-frequency resource used by the terminal device using the second transmission mode for the data transmission is a resource that is independently selected by the terminal device using the second transmission mode from a resource pool corresponding to the second transmission mode.

5. A terminal device, comprising:
  a processor; and a transceiver, connected to the processor and configured to receive and send information under control of the processor;

wherein the processor is configured to:
- control the transceiver to receive configuration information from a network device, the configuration information indicating a plurality of candidate resource pools;
- determine the plurality of candidate resource pools based on the configuration information;
- control the transceiver to receive downlink control information (DCI) from the network device;
- determine a target resource pool of the terminal device for data transmission from the plurality of candidate resource pools according to a target search space for receiving the DCI; and
- perform the data transmission in the target resource pool.

6. The terminal device of claim 5, wherein the DCI is scrambled by using a radio network temporary identity (RNTI).

7. The terminal device of claim 5, wherein resources within each of the plurality of candidate resource pools are capable of being scheduled by the network device to the terminal device for data transmission.

8. The terminal device of claim 5, wherein a time-frequency resource used by the terminal device using the first transmission mode for the data transmission is a resource scheduled by the network device; and a time-frequency resource used by the terminal device using the second transmission mode for the data transmission is a resource that is independently selected by the terminal device using the second transmission mode from a resource pool corresponding to the second transmission mode.

9. The method of claim 1, wherein determining, by the terminal device, the target resource pool according to the target search space for receiving the DCI comprises:
- determining, by the terminal device, a resource pool corresponding to the target search space as the target resource pool according to the target search space and mapping relationships between a plurality of target search spaces and a plurality of resource pools.

10. The method of claim 9, wherein the plurality of target search spaces comprise a dedicated search space and a common search space of the terminal device.

* * * * *